(12) United States Patent
Dong et al.

(10) Patent No.: US 10,701,181 B2
(45) Date of Patent: Jun. 30, 2020

(54) REAL-TIME RESOURCE NEGOTIATION WITH DYNAMIC OPTIONS

(71) Applicant: International Business Machines Corporation, Armonk, NY (US)

(72) Inventors: Nan Dong, Beijing (CN); Wen Hui Fan, Beijing (CN); June-Ray Lin, Taipei (TW); Jin Zhang, Beijing (CN); Li Bo Zhang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 560 days.

(21) Appl. No.: 15/398,860

(22) Filed: Jan. 5, 2017

(65) Prior Publication Data

US 2018/0191864 A1 Jul. 5, 2018

(51) Int. Cl.
| | | |
|---|---|---|
| *H04L 29/08* | (2006.01) | |
| *G06Q 50/30* | (2012.01) | |
| *H04L 12/927* | (2013.01) | |
| *G06Q 10/02* | (2012.01) | |

(52) U.S. Cl.
CPC .......... *H04L 67/327* (2013.01); *G06Q 50/30* (2013.01); *H04L 67/18* (2013.01); *H04L 67/22* (2013.01); *G06Q 10/025* (2013.01); *H04L 47/801* (2013.01)

(58) Field of Classification Search
CPC ....... H04L 47/801; H04L 51/04; H04L 67/18; H04L 67/22; H04L 67/327; H04L 65/1063; H04L 67/42; G06Q 10/10; G06Q 10/109; G06Q 10/1095; G06Q 10/02; G06Q 10/06; G06Q 50/14; G06Q 50/30; G06Q 10/025; G06Q 10/087; G06Q 10/1093; G06Q 30/0283; G06Q 30/04; G06Q 30/0601; G06Q 30/0613; G06Q 50/01; G06Q 50/12; A61K 48/00; G06F 16/951; G06F 9/52
See application file for complete search history.

(56) References Cited

U.S. PATENT DOCUMENTS

| | | | | |
|---|---|---|---|---|
| 6,701,311 | B2 * | 3/2004 | Biebesheimer | ....... G06F 16/951 |
| 6,778,193 | B2 * | 8/2004 | Biebesheimer | ... G06F 16/24578 715/805 |
| 6,785,676 | B2 * | 8/2004 | Oblinger | ............... G06Q 30/02 |
| 7,108,173 | B1 * | 9/2006 | Wang | .................... G06Q 10/02 235/377 |

(Continued)

FOREIGN PATENT DOCUMENTS

CN 101000608 A 7/2007

*Primary Examiner* — David R Lazaro
(74) *Attorney, Agent, or Firm* — Yee & Associates, P.C.

(57) ABSTRACT

Automatically reserving a requested resource in real-time is provided. In response to posting a resource request message that includes a set of resource request criteria on a network, a set of resource availability options is received from a set of resource service providers via the network using a negotiation communication channel. The set of resource availability options received from the set of resource service providers is ranked based on an amount of matching between constraints of each respective resource availability option and the set of resource request criteria. The set of resource availability options is displayed by rank from a greatest amount to a least amount of matching in a resource negotiation table.

14 Claims, 9 Drawing Sheets

(56) References Cited

U.S. PATENT DOCUMENTS

| | | | | |
|---|---|---|---|---|
| 7,343,313 B2* | 3/2008 | Dorenbosch | ......... | G06Q 10/109 |
| | | | | 705/7.19 |
| 7,970,666 B1* | 6/2011 | Handel | ................. | G06Q 10/06 |
| | | | | 705/28 |
| 8,090,707 B1* | 1/2012 | Orttung | ............... | G06Q 10/025 |
| | | | | 705/319 |
| 8,121,953 B1* | 2/2012 | Orttung | ............. | G06Q 10/1095 |
| | | | | 705/35 |
| 8,484,088 B1* | 7/2013 | Orttung | ................. | G06Q 10/06 |
| | | | | 705/26.1 |
| 8,849,837 B2* | 9/2014 | Dua | ....................... | G06F 16/25 |
| | | | | 707/750 |
| 9,161,994 B1* | 10/2015 | Billington | .............. | A61K 48/00 |
| 9,226,975 B1* | 1/2016 | Orttung | ................. | A61K 48/00 |
| 9,552,599 B1* | 1/2017 | Alag | ................... | H04L 65/1063 |
| 2003/0236700 A1* | 12/2003 | Arning | ................. | G06F 16/951 |
| | | | | 705/347 |
| 2004/0064355 A1* | 4/2004 | Dorenbosch | ......... | G06Q 10/109 |
| | | | | 705/7.19 |
| 2012/0005613 A1* | 1/2012 | O'Sullivan | .......... | G06Q 10/109 |
| | | | | 715/772 |
| 2012/0203457 A1* | 8/2012 | Casey | .................... | H04W 4/02 |
| | | | | 701/533 |
| 2012/0296993 A1* | 11/2012 | Heyman | ................ | G06Q 10/06 |
| | | | | 709/206 |
| 2013/0317911 A1* | 11/2013 | Medlen | ................. | G06Q 30/02 |
| | | | | 705/14.58 |
| 2017/0061392 A1* | 3/2017 | Meza-Guinea | .... | G06Q 10/1095 |
| 2018/0191864 A1* | 7/2018 | Dong | ................... | H04L 67/327 |

* cited by examiner

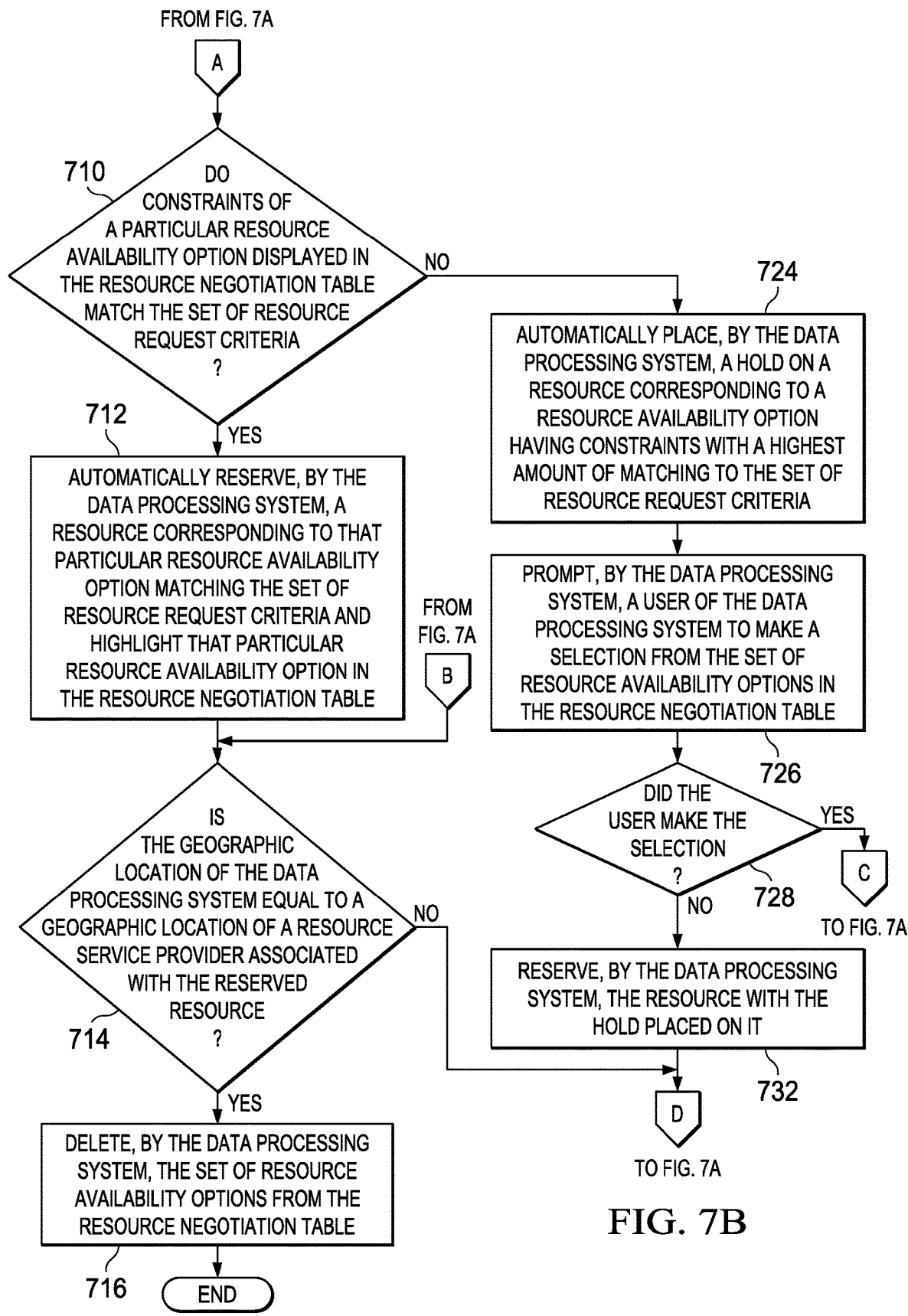

REAL-TIME RESOURCE NEGOTIATION WITH DYNAMIC OPTIONS

BACKGROUND

1. Field

The disclosure relates generally to reserving resources and more specifically to automatically reserving in real-time a resource of a resource service provider that has resource constraints matching resource request criteria of a resource requester via a negotiation communication channel established between the resource requester and the resource service provider.

2. Description of the Related Art

At times people require resources, immediately, such as, for example, a meeting room for thirty minutes or a restaurant table that seats four people for an hour. Current booking systems are effective, but are not negotiable. For example, if a person requests a resource for one hour, but the resource is only available for forty five minutes, the booking system may fail to display this option. Moreover, the booking system is one-way and not active by default. Consequently, if a similar resource later becomes available for one hour, the person does not get an opportunity to switch to that other resource.

SUMMARY

According to one illustrative embodiment, a computer-implemented method for automatically reserving a requested resource in real-time is provided. In response to a data processing system posting a resource request message that includes a set of resource request criteria on a network, the data processing system receives a set of resource availability options from a set of resource service providers via the network using a negotiation communication channel. The set of resource request criteria and the set of resource availability options are dynamic in that a resource requester and a resource service provider can add new resource request criteria and new resource availability options as desired in real-time. The data processing system ranks the set of resource availability options received from the set of resource service providers based on an amount of matching between constraints of each respective resource availability option and the set of resource request criteria. The data processing system displays the set of resource availability options by rank from a greatest amount to a least amount of matching in a resource negotiation table. The data processing system will automatically cancel a resource reservation and make a new resource reservation when the data processing system finds a better matching resource availability option before a cancellation deadline. According to other illustrative embodiments, a data processing system and computer program product for automatically reserving a requested resource in real-time are provided.

BRIEF DESCRIPTION OF THE DRAWINGS

FIGS. 7A-7B are a flowchart illustrating a process for a data processing system corresponding to a resource requester in accordance with an illustrative embodiment.

DETAILED DESCRIPTION

Figure 1:
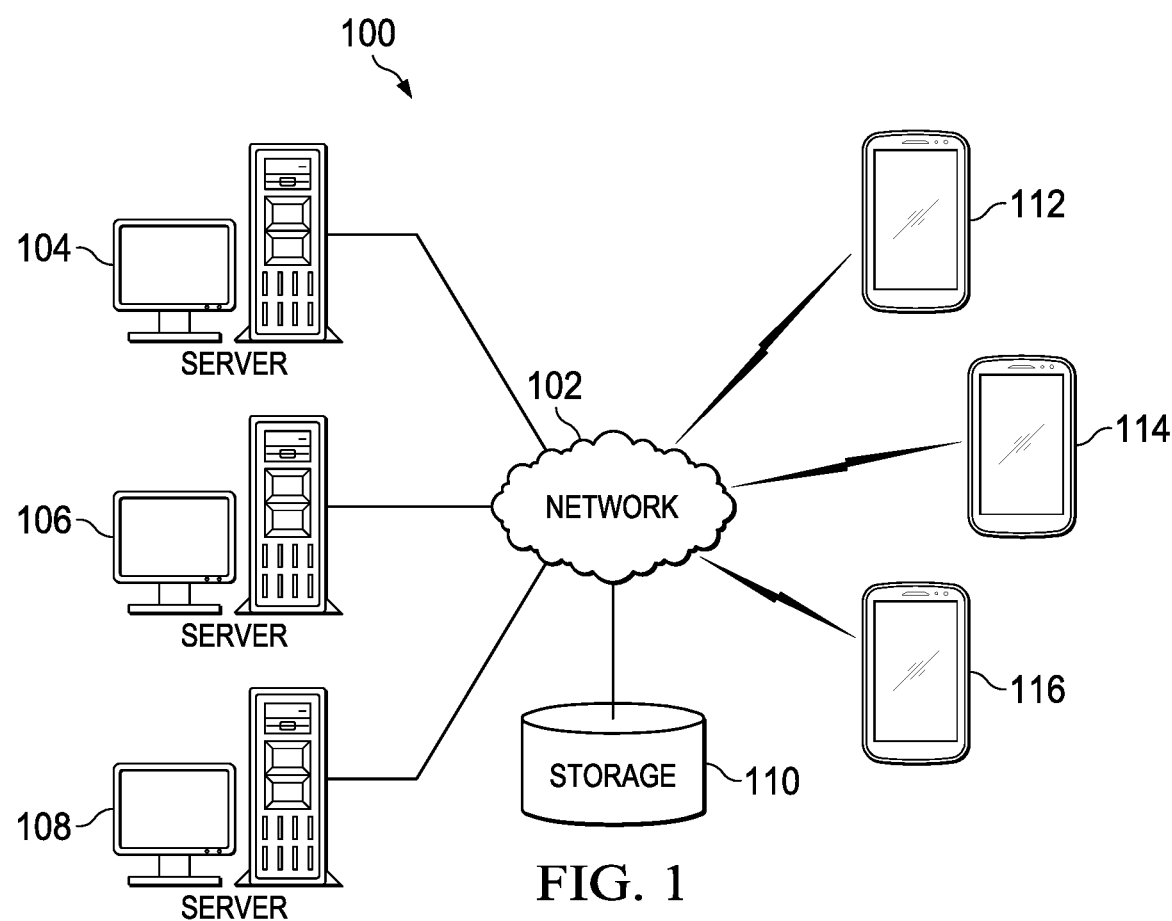
FIG. 1 is a pictorial representation of a network of data processing systems in which illustrative embodiments may be implemented.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
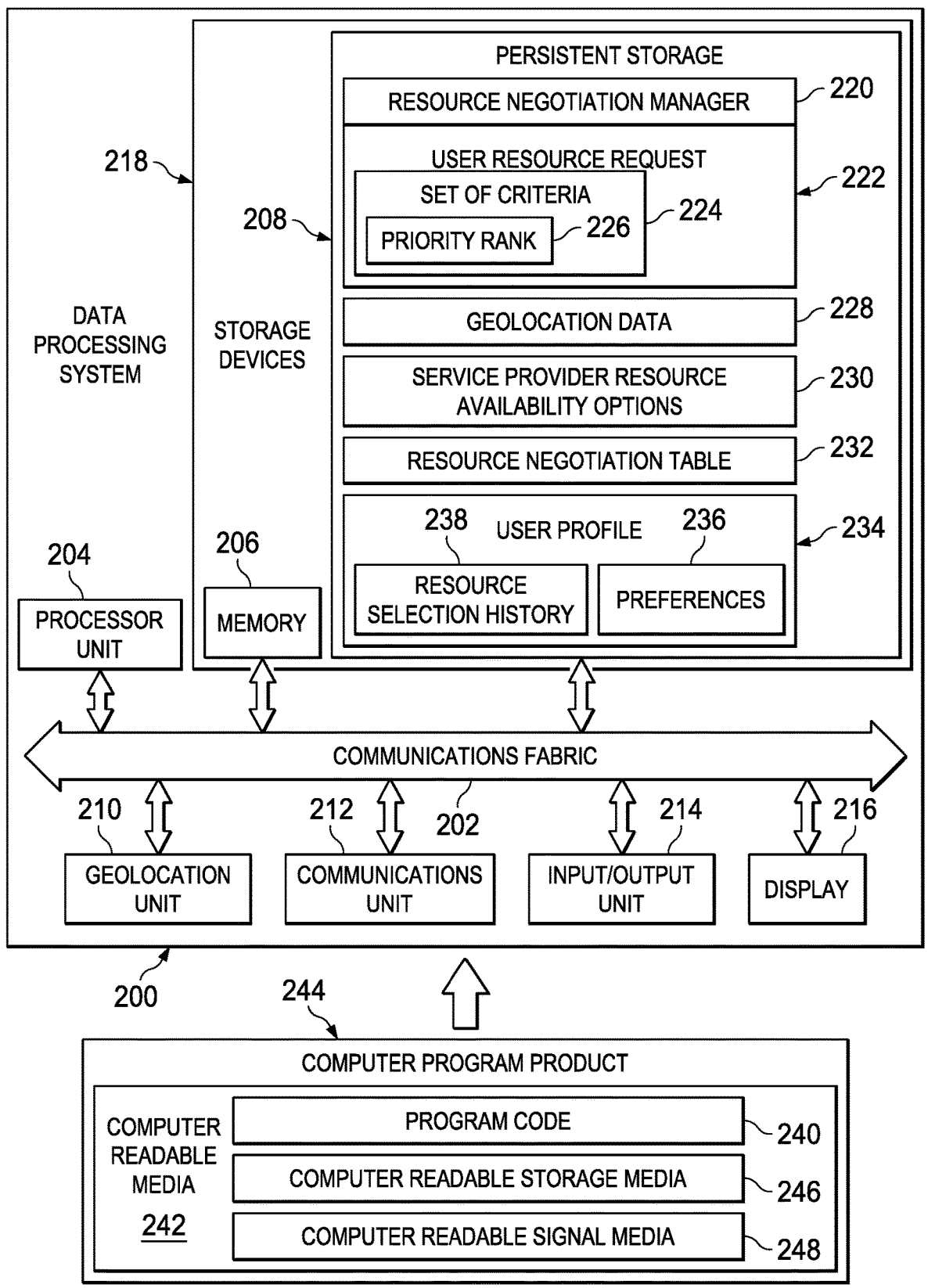
FIG. 2 is a diagram of a data processing system in which illustrative embodiments may be implemented.
Figure 3:
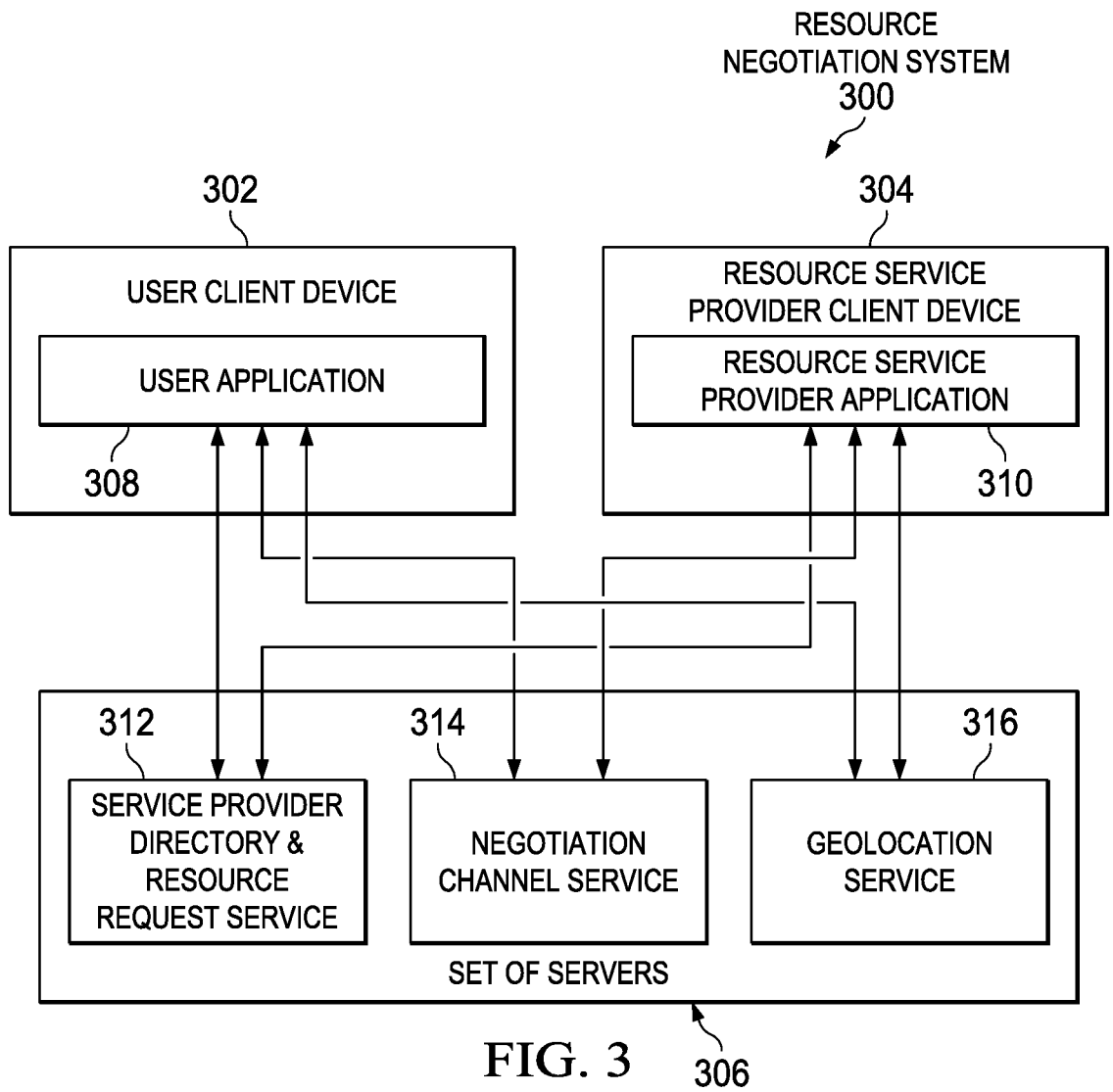
FIG. 3 is a diagram illustrating an example of a resource negotiation system in accordance with an illustrative embodiment.

With reference now to the figures, and in particular, with reference to FIGS. 1-3, diagrams of data processing environments are provided in which illustrative embodiments may be implemented. It should be appreciated that FIGS. 1-3 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, data processing systems, and other devices in which the illustrative embodiments may be implemented. Network data processing system 100 contains network 102, which is the medium used to provide communications links between the computers, data processing systems, and other devices connected together within network data processing system 100. Network 102 may include connections, such as, for example, wire communication links, wireless communication links, and fiber optic cables.

In the depicted example, server 104, server 106, and server 108 connect to network 102, along with storage 110. Server 104, server 106, and server 108 may be, for example, server computers with high-speed connections to network 102. Server 104 may provide a set of one or more services to users of client devices connected to network 102. For example, server 104 may provide a set of resource service provider directory and resource request services to a plurality of client device users. Also, it should be noted that server 104 may represent a plurality of different servers providing a plurality of different resource service provider directory and resource request services.

Server 106 also may provide a set of one or more services to client device users connected to network 102. For example, server 106 may provide services for establishing and maintaining resource negotiation communication channels between resource requester client devices and resource service provider client devices. It should be noted that server 106 also may represent a plurality of different servers for managing resource negotiation communication channels between client devices.

In addition, server 108 may provide a set of one or more services to client device users connected to network 102. For example, server 108 may provide geolocation services for identifying the geographic locations of client devices. The geolocation services may utilize, for example, global positioning system (GPS) coordinate data or cellular telephone tower triangulation data to determine the geographic location of client devices connected to network 102. It should be noted that server 108 also may represent a plurality of different servers for providing the geolocation services.

Client 112, client 114, and client 116 also connect to network 102. Clients 112, 114, and 116 are clients of server 104, server 106, and server 108. Further, server 104, server 106, and server 108 may provide information, such as boot files, operating system images, and software applications to clients 112, 114, and 116.

In this example, clients 112, 114, and 116 are illustrated as mobile communication devices, such as smart phones or cellular telephones, with wireless communication links to network 102. However, it should be noted that clients 112, 114, and 116 are meant as examples only. In other words, clients 112, 114, and 116 may include other types of data processing systems, such as, for example, smart watches, personal digital assistants, handheld computers, gaming devices, desktop or personal computers, and the like, with wireless or wire communication links to network 102. Users of clients 112, 114, and 116 may utilize clients 112, 114, and 116 to access the different services provided by servers 104-108.

Client 112 may correspond to a resource requestor, for example. A resource requester is a person requesting use of a resource, such as a meeting room or a restaurant table, based on specified criteria, such as resource type or size, start time, time duration, location, et cetera, from a resource service provider. A resource service provider is capable of providing the resource to the resource requester based on the criteria specified by the resource requester within resource availability constraints. The resource requester of client 112 may post a resource request message on network 102 for resource service providers to respond to. In addition, client 112 may establish a resource negotiation communication channel via network 102 between client 112 and client devices corresponding to responding resource service providers. It should be noted that client 112 may represent a plurality of different client devices corresponding to a plurality of different resource requesters connected to network 102.

Client 114 and client 116 may each correspond to a different resource service provider. The resource service providers corresponding to clients 114 and 116 may send resource availability options to the resource requester corresponding to client 112 based on the specified criteria in the posted resource request message. Clients 114 and 116 may send the resource availability options to client 112 using the established resource negotiation communication channel. It should be noted that client 114 and client 116 represent a plurality of different resource service providers connected to network 102.

Storage 110 is a network storage device capable of storing any type of data in a structured format or an unstructured format. In addition, storage 110 may represent a set of one or more network storage devices. Storage 110 may store, for example, names and identification numbers for a plurality of different resource requesters; names and identification numbers for a plurality of different resource service providers; lists of resources provided by each of the plurality of different resource service providers; profiles corresponding to resource requesters; resource selection histories of resource requesters; and the like. Further, storage 110 may store other data, such as authentication or credential data that may include user names, passwords, and biometric data associated with the resource requesters and resource service providers, for example.

In addition, it should be noted that network data processing system 100 may include any number of additional server devices, client devices, and other devices not shown. Program code located in network data processing system 100 may be stored on a computer readable storage medium and downloaded to a computer or data processing system for use. For example, program code may be stored on a computer readable storage medium on server 104 and downloaded to client 112 over network 102 for use on client 112.

In the depicted example, network data processing system 100 may be implemented as a number of different types of communication networks, such as, for example, a telephone network (e.g., a wireless network), an internet, an intranet, a local area network (LAN), a wide area network (WAN), or any combination thereof. FIG. 1 is intended as an example, and not as an architectural limitation for the different illustrative embodiments.

With reference now to FIG. 2, a diagram of a data processing system is depicted in accordance with an illustrative embodiment. Data processing system 200 is an example of a data processing system, such as client 112 in FIG. 1, in which computer readable program code or program instructions implementing processes of illustrative embodiments may be located. In this illustrative example, data processing system 200 includes communications fabric 202, which provides communications between processor unit 204, memory 206, persistent storage 208, geolocation unit 210, communications unit 212, input/output (I/O) unit 214, and display 216.

Processor unit 204 serves to execute instructions for software applications and programs that may be loaded into memory 206. Processor unit 204 may be a set of one or more hardware processor devices or may be a multi-processor core, depending on the particular implementation. Further, processor unit 204 may be implemented using one or more heterogeneous processor systems, in which a main processor is present with secondary processors on a single chip. As another illustrative example, processor unit 204 may be a symmetric multi-processor system containing multiple processors of the same type.

Memory 206 and persistent storage 208 are examples of storage devices 218. A computer readable storage device is any piece of hardware that is capable of storing information, such as, for example, without limitation, data, computer readable program code in functional form, and/or other suitable information either on a transient basis and/or a persistent basis. Further, a computer readable storage device excludes a propagation medium. Memory 206, in these examples, may be, for example, a random access memory, or any other suitable volatile or non-volatile storage device. Persistent storage 208 may take various forms, depending on the particular implementation. For example, persistent storage 208 may contain one or more devices. For example, persistent storage 208 may be a hard drive, a flash memory, a rewritable optical disk, a rewritable magnetic tape, or some combination of the above. The media used by persistent storage 208 may be removable. For example, a removable hard drive may be used for persistent storage 208.

In this example, persistent storage 208 stores resource negotiation manager 220. Resource negotiation manager 220 controls the process of reserving in real-time a resource of a resource service provider that has resource constraints matching resource request criteria of a resource requester via a negotiation communication channel established between the resource requester and the resource service provider. It should be noted that even though resource negotiation manager 220 is illustrated as residing in persistent storage 208, in an alternative illustrative embodiment resource negotiation manager 220 may be a separate component of data processing system 200. For example, resource negotiation manager 220 may be a hardware component coupled to communication fabric 202 or a combination of hardware and software components. In another alternative illustrative embodiment, resource negotiation manager 220 may be located in a server device, such as server 104 in FIG. 1. In a further alternative illustrative embodiment, a first set of components of resource negotiation manager 220 may be located in data processing system 200 and a second set of components of resource negotiation manager 220 may be located in a server device.

Resource negotiation manager 220 posts or publishes user resource request 222 on a network using an established multi-party resource negotiation communication channel between data processing system 200, which corresponds to a user (i.e., the resource requester), and a set of one or more resource service providers. The set of resource service providers may be, for example, clients 114 and 116 in FIG. 1. User resource request 222 is a request for a resource, such as a restaurant table. User resource request 222 includes set of criteria 224. Set of criteria 224 contains user-specified information regarding the requested resource. For example, set of criteria may contain a specified location or area, such as a designated portion of a city, for resource service providers to provide the requested resource, such as a table, time the requested resource is initially needed, such as noon, duration of time the requested resource is needed, such as two hours, and the like.

In addition, the resource requester may arrange set of criteria 224 by priority rank 226. Priority rank 226 represents a ranking for each criterion in criteria 224 by priority order that is specified by the resource requester. For example, time and time duration may be of higher priority to the resource requester than location of the resource service provider. Consequently, the resource requester may list time and time duration in set of criteria 224 before location indicating priority rank 226 of the criteria.

Further, resource negotiation manager 220 may obtain geolocation data 228 from geolocation unit 210 and send geolocation data 228 to the set of resource service providers. Geolocation data 228 represent a current location of data processing system 200. Geolocation data 228 may be, for example, GPS coordinates. Resource negotiation manager 220 may utilize geolocation data 228 to determine whether the resource requester will arrive at the location of the resource service provider providing the resource at the time requested.

The resource service providers with resource availability constraints matching or closely matching set of criteria 224 in user resource request 222 send service provider resource availability options 230 to data processing system 200 via the resource negotiation communication channel established between data processing system 200 and the resource service providers. Service provider resource availability options 230 represent a set of options corresponding to the requested resource that each resource service provider is able to provide to the resource requester (i.e., the user of data processing system 200).

Resource negotiation manager 220 places service provider resource availability options 230 in resource negotiation table 232. Resource negotiation table 232 is a dynamic real-time interactive table that the user of data processing system 200 is able to review and change priority rank 226 of one or more criteria in set of criteria 224 or change preference regarding a particular resource availability option in service provider resource availability options 230 as desired by the user. Resource negotiation manager 220 may initially organize service provider resource availability options 230 in resource negotiation table 232 based on an amount or level of matching between set of criteria 224 and the resource constraints listed in each respective resource availability option in service provider resource availability options 230. For example, resource negotiation manager 220 may list a particular resource availability option first in resource negotiation table 232 based on that particular resource availability option having an exact match or a highest amount of matching with set of criteria 224 and list another resource availability option last in resource negotiation table 232 based on that resource availability option having a lowest or least amount of matching with set of criteria 224.

Also n this example, persistent storage 208 stores user profile 234. User profile 234 corresponds to the user of data processing system 200 and contains information associated with the user. For example, user profile 234 includes preferences 236 and resource selection history 238. Preferences 236 represent resource selection preferences specified by the user. Resource selection history 238 represents a history of previous resource selections made by the user over time. Resource negotiation manager 220 may automatically record the user's resource selections and store that information in resource selection history 238. Resource negotiation manager 220 may utilize preferences 236 and/or resource selection history 238 to determine which resource availability option to automatically reserve when two or more resource availability options are substantially equal (i.e., having the same amount of matching with the user-specified resource request criteria).

Geolocation unit 210 may be, for example, a GPS transceiver. Geolocation unit 210 may send the GPS coordinate data to resource negotiation manager 220 or may send the GPS coordinate data directly to the resource service provider corresponding to the selected resource availability option. Communications unit 212, in this example, provides for communication with other computers, data processing systems, and devices via a network, such as network 102 in FIG. 1. Communications unit 212 may provide communications using both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultra high frequency, microwave, wireless fidelity (WiFi), bluetooth technology, global system for mobile communications (GSM), code division multiple access (CDMA), second-generation (2G), third-generation (3G), fourth-generation (4G), 4G Long Term Evolution (LTE), LTE Advanced, or any other wireless communication technology or standard to establish a wireless communications link for data processing system 200.

Input/output unit 214 allows for the input and output of data with other devices that may be connected to data processing system 200. For example, input/output unit 214 may provide a connection for user input through a keypad and/or some other suitable input device. Display 216 provides a mechanism to display information to a user and may include touch screen capabilities to allow the user to make on-screen selections through user interfaces or input data, for example. For example, resource negotiation manager 220 may display resource negotiation table 232 on display 216 for the user of data processing system 200 to review and select a resource availability option or change priority of one or more resource request criteria.

Instructions for the operating system, applications, and/or programs may be located in storage devices 218, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented program instructions, which may be located in a memory, such as memory 206. These program instructions are referred to as program code, computer usable program code, or computer readable program code that may be read and run by a processor in processor unit 204. The program code, in the different embodiments, may be embodied on different physical computer readable storage devices, such as memory 206 or persistent storage 208.

Program code 240 is located in a functional form on computer readable media 242 that is selectively removable and may be loaded onto or transferred to data processing system 200 for running by processor unit 204. Program code 240 and computer readable media 242 form computer program product 244. In one example, computer readable media 242 may be computer readable storage media 246 or computer readable signal media 248. Computer readable storage media 246 may include, for example, an optical or magnetic disc that is inserted or placed into a drive or other device that is part of persistent storage 208 for transfer onto a storage device, such as a hard drive, that is part of persistent storage 208. Computer readable storage media 246 also may take the form of a persistent storage, such as a hard drive, a thumb drive, or a flash memory that is connected to data processing system 200. In some instances, computer readable storage media 246 may not be removable from data processing system 200.

Alternatively, program code 240 may be transferred to data processing system 200 using computer readable signal media 248. Computer readable signal media 248 may be, for example, a propagated data signal containing program code 240. For example, computer readable signal media 248 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communication links or wireless transmissions containing the program code.

In some illustrative embodiments, program code 240 may be downloaded over a network to persistent storage 208 from another device or data processing system through computer readable signal media 248 for use within data processing system 200. For instance, program code stored in a computer readable storage media in a data processing system may be downloaded over a network from the data processing system to data processing system 200. The data processing system providing program code 240 may be a server computer, a client computer, or some other device capable of storing and transmitting program code 240.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a computer readable storage device in data processing system 200 is any hardware apparatus that may store data. Memory 206, persistent storage 208, and computer readable storage media 246 are examples of physical storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Illustrative embodiments display a resource negotiation table with dynamic resource availability options, which illustrative embodiments organize by resource request criteria or categories specified by a resource requester in a resource request message. Resource availability options may dynamically appear or disappear from the resource negotiation table based on the resource request criteria, such as, resource availability, location, time, et cetera. The resource requester only needs to sort the resource availability options in the resource negotiation table by, for example, dragging and dropping a preferred resource availability option to the top of the resource negotiation table. If both the constraints of a resource availability option and the resource request criteria "match" exactly, then illustrative embodiments automatically reserve that particular resource availability option until the resource requester cancels the reservation or the resource requester receives and switches to a better resource availability option. As new resource availability options become available, illustrative embodiments populate the resource negotiation table with the newly available options. The resource requester may choose to accept a new option or not and then sort the options by preference by, for example, sliding an option to the top of the table or sliding an option down in the list of available options.

Illustrative embodiments publish resource requests and resource service provider options in one or more predefined geographic regions or areas. In addition, illustrative embodiments establish or set up multi-party resource negotiation communication channels, such as, for example, chat room sessions, between the resource requesters and the resource service providers. Further, illustrative embodiments utilize a free form negotiation process that accepts in real-time new resource request criteria and new resource availability options at any time. Furthermore, illustrative embodiments may automatically cancel a plurality of reserved resources and automatically reserve new resources for resource requesters based on a chain reaction caused by a change in one resource reservation. In addition, resource availability option updates from resource service providers may include a cancellation deadline (e.g., how much time before actual fulfillment of a reservation) without a resource requester incurring a penalty, such as loss of the reservation.

Illustrative embodiments may dynamically display resource availability options in the resource negotiation table as the resource requester moves around geographically. Illustrative embodiments also may automatically cancel a currently reserved resource if the resource requester is moving away from the location of the reserved resource or if illustrative embodiments determine that the resource requester cannot make the reservation on time based on the current geolocation of the resource requester and the geolocation of the reserved resource. Moreover, illustrative embodiments may automatically cancel a currently reserved resource if the resource requester cannot fulfill the reservation before the resource service provider-defined cancellation deadline.

It should be noted that illustrative embodiments may apply to all e-business applications, such as, hotel reservations, restaurant reservations, airline reservations, ticket reservations, e-commerce, et cetera. As a result, illustrative embodiments may increase trade efficiency and increase trade volume for registered resource service providers.

With reference now to FIG. 3, a diagram illustrating an example of a resource negotiation system is depicted in accordance with an illustrative embodiment. Resource negotiation system 300 is a system of software and hardware components for reserving in real-time a resource of a resource service provider that has resource constraints matching resource request criteria of a resource requester via a negotiation communication channel established between the resource requester and the resource service provider. Resource negotiation system 300 may be implemented in a network of data processing systems, such as, for example, network data processing system 100 in FIG. 1.

In this example, resource negotiation system 300 includes user client device 302, resource service provider client device 304, and set of servers 306. User client device 302 may be, for example, client 112 in FIG. 1 or data processing system 200 in FIG. 2. Resource service provider client device 304 may be, for example, client 114 in FIG. 1. Set of servers 306 may be, for example, servers 104-108 in FIG. 1. However, it should be noted that set of servers 306 may represent one server or a plurality of servers. Also, resource negotiation system 300 may include any number of user client devices, resource service provider client devices, and server devices.

User application 308 of user client device 302 posts a resource request that includes a set of one or more criteria on service provider directory and resource request service 312. The resource request that includes the set of criteria may be, for example, user resource request 222 that includes set of criteria 224 in FIG. 2. Service provider directory and resource request service 312 stores a directory of all registered resource service providers in one or more predefined geographic regions and posted resource requests. Resource service provider client device 304 represents one of many resource service provider client devices that may be associated with a particular resource requested by user application 308.

Resource service provider application 310 of resource service provider client device 304 retrieves the posted resource request from service provider directory and resource request service 312 and responds by sending a set of one or more resource availability options that match or almost match the set of criteria included in the resource request via a negotiation communication channel established by negotiation channel service 314 between user application 308 and resource service provider application 310. Further, user application 308 may send geolocation data, such as geolocation data 228 in FIG. 2, which corresponds to the current geographic location of user client device 302, to geolocation service 316. Geolocation service 316 tracks the current geographic location of user client device 302 to determine whether user client device 302 is moving toward or moving away from a geographic location corresponding to resource service provider client device 304 and may transmit that information to resource service provider client device 304.

Figure 4:
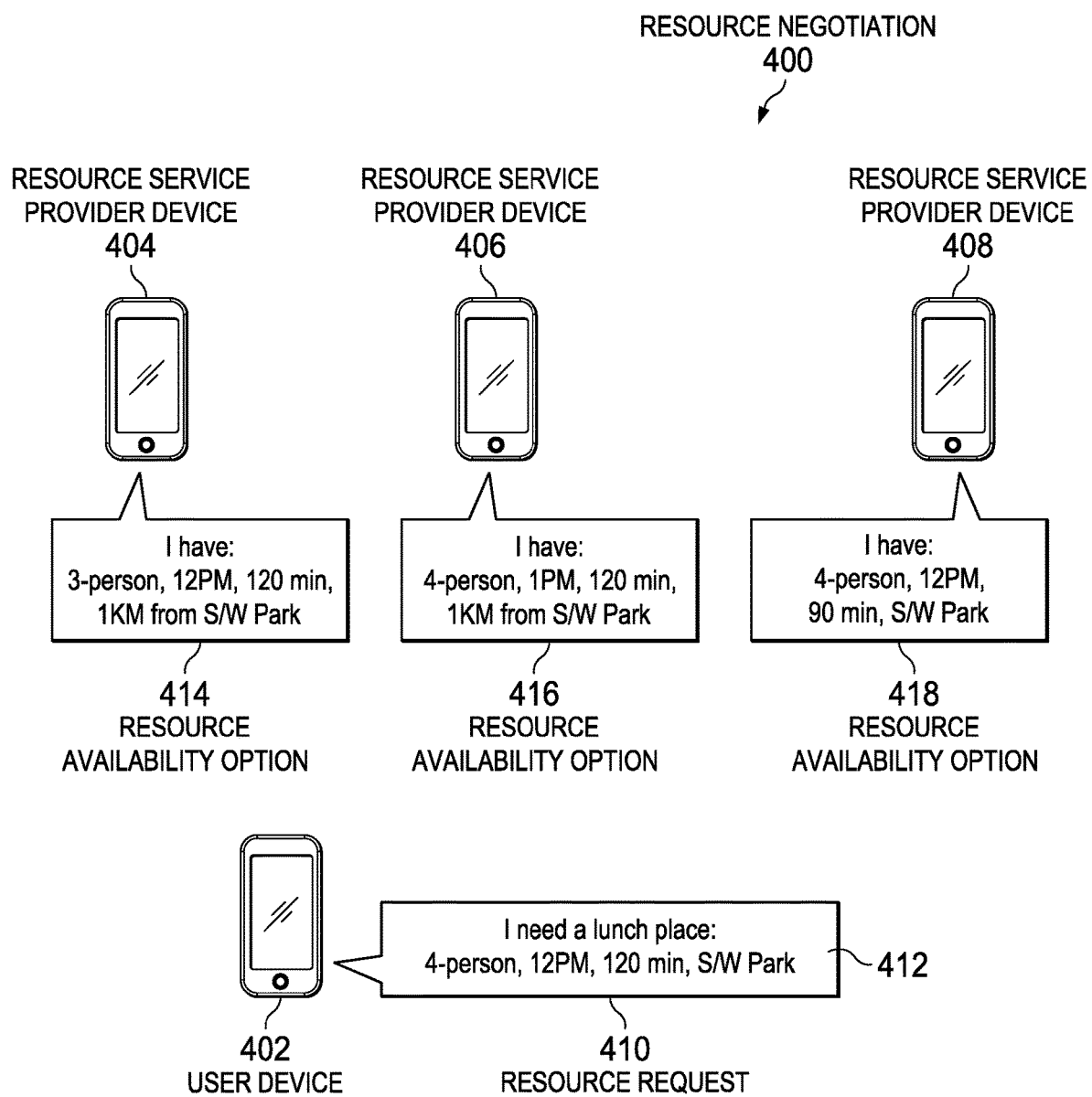
FIG. 4 is an example of a resource negotiation in accordance with an illustrative embodiment.

With reference now to FIG. 4, an example of a resource negotiation is depicted in accordance with an illustrative embodiment. Resource negotiation 400 represents a negotiation between a resource requester and a set of resource service providers. Resource negotiation 400 may be implemented in a network of data processing systems, such as, for example, network data processing system 100 in FIG. 1 or resource negotiation system 300 in FIG. 3.

In this example, resource negotiation 400 is between user device 402, resource service provider device 404, resource service provider device 406, and resource service provider device 408. However, it should be noted that resource negotiation 400 may include more or fewer resource service provider devices than illustrated. User device 402 starts resource negotiation 400 by posting resource request 410 on a network, such as network 102 in FIG. 1, using a negotiation communication channel.

Resource request 410 may be, for example, user resource request 222 in FIG. 2. Resource request 410 includes criteria 412, such as set of criteria 224 in FIG. 2. In this example, criteria 412 are "I need a lunch place: 4-person, 12 PM, 120 min, S/W Park."

Resource service provider device 404, resource service provider device 406, and resource service provider device 408 respond to posted resource request 410 by sending resource availability option 414, resource availability option 416, and resource availability option 418, respectively, to user device 402 via the negotiation communication channel. Resource availability option 414, resource availability option 416, and resource availability option 418 may be, for example, service provider resource availability options 230 in FIG. 2. In this example, resource availability option 414 is "I have: 3-person, 12 PM, 120 min, 1 KM from S/W Park," resource availability option 416 is "I have: 4-person, 1 PM, 120 min, 1 KM from S/W Park," and resource availability option 418 is "I have: 4-person, 12 PM, 90 min, S/W Park."

A resource negotiation manager, such as resource negotiation manager 220 in FIG. 2, of user device 402 may place resource availability options 414-418 in a resource negotiation table, such as resource negotiation table 232 in FIG. 2. In addition, the resource negotiation manager may arrange resource availability options 414-418 in an order based on an amount of matching between each respective resource availability option and resource request criteria 412. Further, because none of resource availability options 414-418 exactly match resource request criteria 412, the resource negotiation manager may automatically place a hold on the resource availability option with a highest amount of matching, which in this example is resource availability option 418. Furthermore, the resource negotiation manager may prompt the user of user device 402 to make a selection of one of resource availability options 414-418 within the resource negotiation table.

Moreover, the set of resource service providers may change as the geographic location of user device 402 changes. Consequently, new resource availability options corresponding to different resource service providers may appear in the resource negotiation table. One or more of these new resource availability options may have a higher amount of matching with resource request criteria 412. As a result, the resource negotiation manager may automatically reserve one of these new resource availability options and automatically cancel the hold on resource availability option 418.

Figure 5:
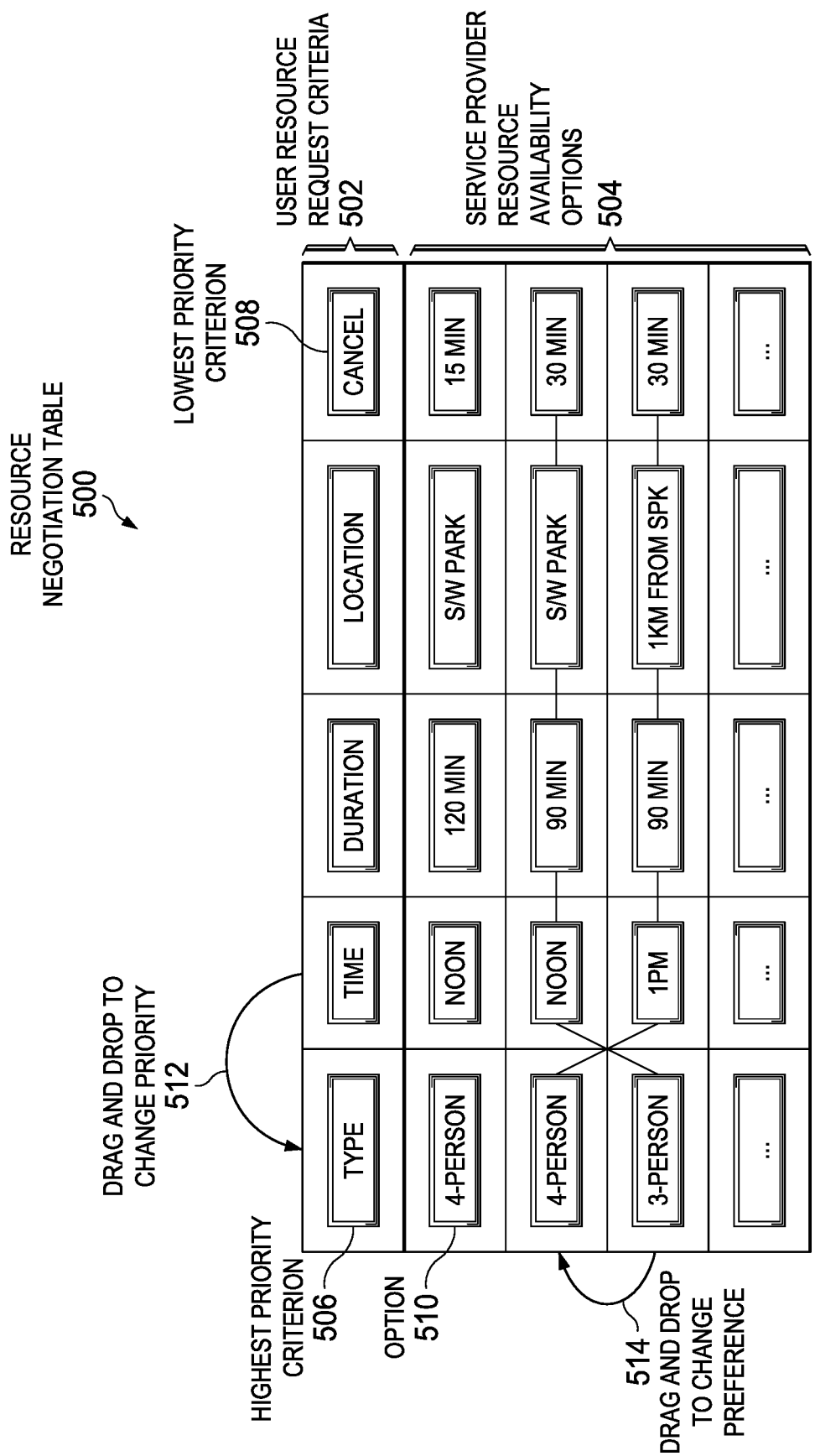
FIG. 5 is an example of a resource negotiation table in accordance with an illustrative embodiment.

With reference now to FIG. 5, an example of a resource negotiation table is depicted in accordance with an illustrative embodiment. Resource negotiation table 500 is an interactive table that displays a set of resource availability options corresponding to criteria of a resource request. The resource requester is able to review resource negotiation table 500 and change priority of one or more resource request criteria or change preference regarding one or more resource availability options as desired by the resource requester in real-time. Resource negotiation table 500 may be, for example, resource negotiation table 232 in FIG. 2.

In this example, resource negotiation table 500 includes resource request criteria 502 and service provider resource availability options 504. Resource request criteria 502 may be, for example, criteria 412 of resource request 410 in FIG. 4. In this example, resource request criteria 502 includes a resource type criterion, a time the resource is initially needed criterion, a time duration the resource is needed criterion, a geographic location criterion, and a cancellation deadline criterion. In addition, a resource negotiation manager may arrange resource request criteria 502 within resource negotiation table 500 by user-specified priority. For example, the resource negotiation manager places the resource type criterion as highest priority criterion 506 and the cancellation deadline criterion as lowest priority criterion 508. Further, a user may drag and drop a selected criterion in resource negotiation table 500 to change priority of that selected criterion at 512. In this example, the user now wants to increase the priority of the time criterion over the resource type criterion.

Service provider resource availability options 504 may be, for example, resource availability options 414-418 in FIG. 4. Using the example of FIG. 4, option 510 exactly matches criteria 412 of resource request 410. As a result, the resource negotiation manager may highlight option 510 of service provider resource availability options 504 and may automatically reserve the resource corresponding to option 504. Further, the user may drag and drop a selected option in resource negotiation table 500 to change preference of that selected option at 514. In this example, the user indicates that option 3 is preferred over option 2.

Figure 6:
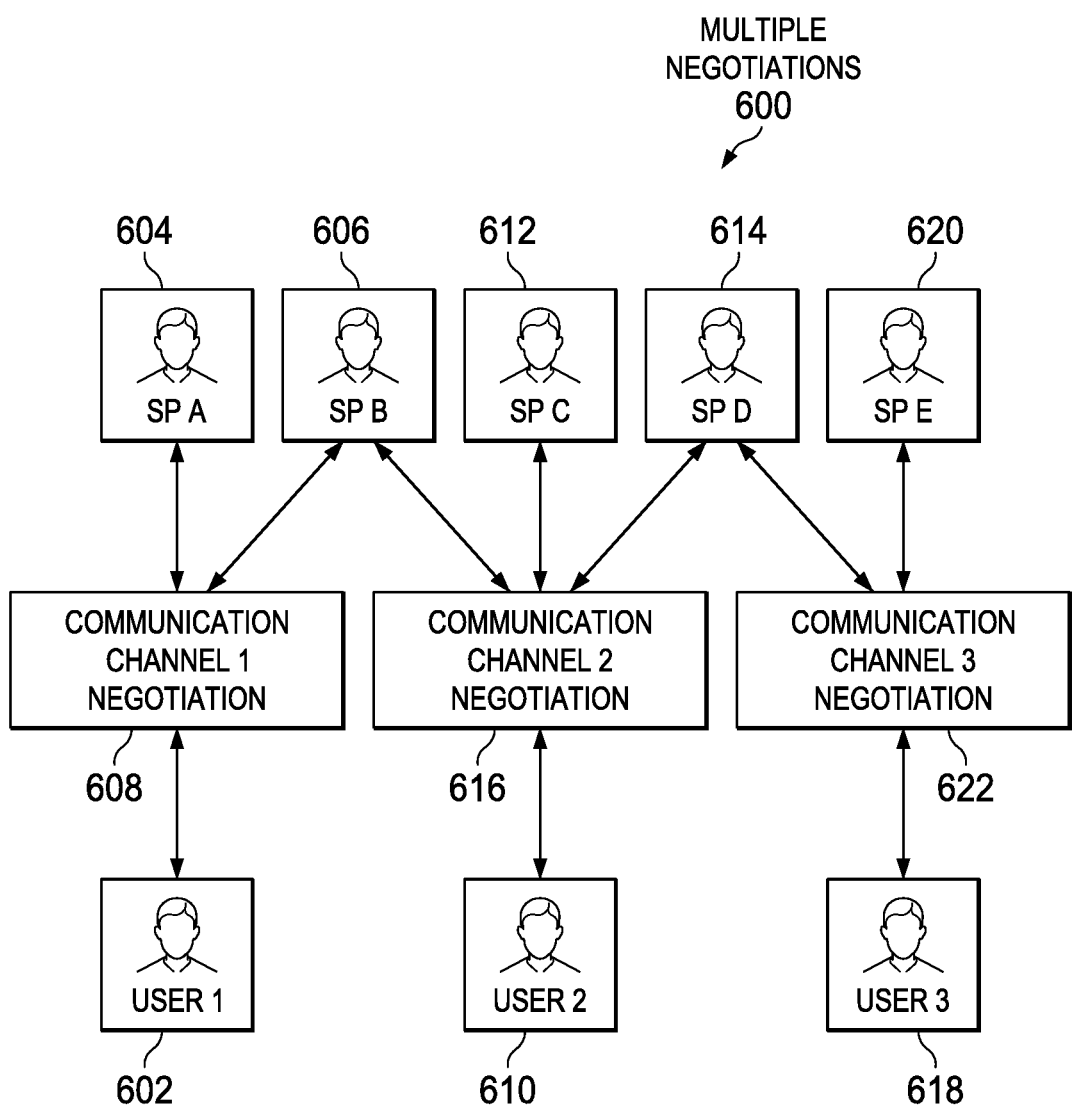
FIG. 6 is an example of multiple resource negotiations in accordance with an illustrative embodiment.

With reference now to FIG. 6, an example of multiple resource negotiations are depicted in accordance with an illustrative embodiment. Multiple resource negotiations 600 represent a plurality of resource negotiations between a plurality of resource requesters and a plurality of resource service providers. In this example, multiple resource negotiations 600 are between: a) user 1 602 and resource service provider A 604 and resource service provider B 606 via communication channel 1 negotiation 608; b) user 2 610 and resource service provider B 606, resource service provider C 612, and resource service provider D 614 via communication channel 2 negotiation 616; and c) user 3 618 and resource service provider D 614 and resource service provider E 620 via communication channel 3 negotiation 622.

In this example, a resource negotiation manager initially reserves the resource corresponding to resource service provider B 606 for user 1 602. Also, the resource corresponding to resource service provider D 614 is reserved for user 2 610 and the resource corresponding to resource service provider E 620 is reserved for user 3 618. However, the resource negotiation manager may determine that user 1 602 has left the region corresponding to resource service provider B 606 and is moving toward the geographic location corresponding to resource service provider A 604. As a result, the resource negotiation manager may automatically cancel the reservation for the resource corresponding to resource service provider B 606 for user 1 602 and automatically reserve the resource corresponding to resource service provider A 604 for user 1 602.

This automatic cancellation and reservation of resources for user 1 602 may trigger a chain reaction among the other resource reservations for user 2 610 and user 3 618. For example, user 2 610 may now be switched from the resource corresponding to resource service provider D 614 to the now open resource corresponding to resource service provider B 606. In addition, user 3 618 may now be switched from the resource corresponding to resource service provider E 620 to the now open resource corresponding to resource service provider D 614.

Figure 7A:
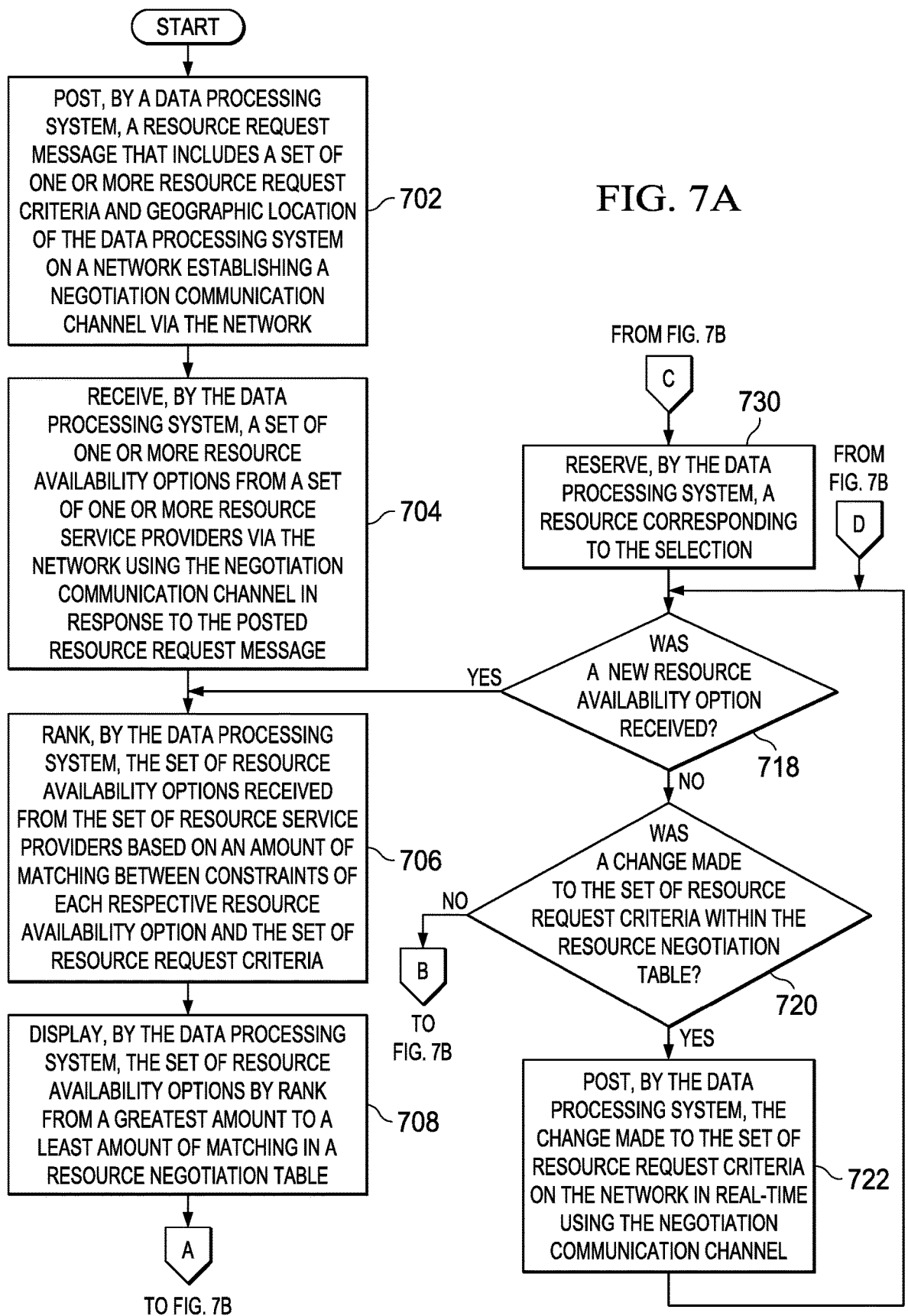

With reference now to FIGS. 7A-7B, a flowchart illustrating a process for a data processing system corresponding to a resource requester is shown in accordance with an illustrative embodiment. The process shown in FIGS. 7A-7B may be implemented in a data processing system, such as, for example, client 112 in FIG. 1 or data processing system 200 in FIG. 2.

The process begins when the data processing system posts a resource request message that includes a set of one or more resource request criteria and geographic location of the data processing system on a network establishing a negotiation communication channel via the network (step 702). The resource request message that includes the set of one or more resource request criteria may be, for example, resource request 410 that includes criteria 412 in FIG. 4. The geographic location of the data processing system may be, for example, geolocation data 228 in FIG. 2. The network may be, for example, network 102 in FIG. 1.

In response to posting the resource request message in step 702, the data processing system receives a set of one or more resource availability options from a set of one or more resource service providers via the network using the negotiation communication channel in response to the posted resource request message (step 704). The set of one or more resource availability options from the set of one or more resource service providers may be, for example, resource availability options 414-418 from resource service provider devices 404-408 in FIG. 4. In addition, the data processing system ranks the set of resource availability options received from the set of resource service providers based on an amount of matching between constraints of each respective resource availability option and the set of resource request criteria (step 706).

Further, the data processing system displays the set of resource availability options by rank from a greatest amount to a least amount of matching in a resource negotiation table (step 708). The resource negotiation table may be, for example, resource negotiation table 500 in FIG. 5. Furthermore, the data processing system makes a determination as to whether constraints of a particular resource availability option displayed in the resource negotiation table match the set of resource request criteria (step 710). If the data processing system determines that constraints of a particular resource availability option displayed in the resource negotiation table do match the set of resource request criteria, yes output of step 710, then the data processing system automatically reserves a resource corresponding to that particular resource availability option matching the set of resource request criteria and highlights that particular resource availability option in the resource negotiation table (step 712).

Afterward, the data processing system makes a determination as to whether the geographic location of the data processing system equals a geographic location of a resource service provider associated with the reserved resource (step 714). If the data processing system determines that the geographic location of the data processing system is equal to the geographic location of the resource service provider associated with the reserved resource, yes output of step 714, then the data processing system deletes the set of resource availability options from the resource negotiation table (step 716). Thereafter, the process terminates.

If the data processing system determines that the geographic location of the data processing system is not equal to the geographic location of the resource service provider associated with the reserved resource, no output of step 714, then the data processing system makes a determination as to whether a new resource availability option was received (step 718). If the data processing system determines that a new resource availability option was received, yes output of step 718, then the process returns to step 706 where the data processing system ranks the new resource availability option with the set of resource availability options in real-time. If the data processing system determines that no new resource availability option was received, no output of step 718, then the data processing system makes a determination as to whether a change was made to the set of resource request criteria within the resource negotiation table (step 720). The change to the set of resource request criteria within the resource negotiation table may be, for example, a change in priority of one or more resource request criteria and/or a change in preference in one or more resource availability options.

If the data processing system determines that no change was made to the set of resource request criteria within the resource negotiation table, no output of step 720, then the process returns to step 714 where the computer continues to determine whether the geographic location of the data processing system equals the geographic location of the resource service provider associated with the reserved resource. If the data processing system determines that a change was made to the set of resource request criteria within the resource negotiation table, yes output of step 720, then the data processing system posts the change made to the set of resource request criteria on the network in real-time using the negotiation communication channel (step 722). Thereafter, the process returns to step 718 where the computer determines whether a new resource availability option was received.

Returning again to step 710, if the data processing system determines that all constraints of any resource availability option displayed in the resource negotiation table do not exactly match the set of resource request criteria, no output of step 710, then the data processing system automatically places a hold on a resource corresponding to a resource availability option having constraints with a highest amount of matching to the set of resource request criteria (step 724). In addition, the data processing system prompts a user of the data processing system to make a selection from the set of resource availability options in the resource negotiation table (step 726). Afterward, the data processing system makes a determination as to whether the user made the selection (step 728).

If the data processing system determines that the user did make the selection, yes output of step 728, then the data processing system reserves a resource corresponding to the selection (step 730). Thereafter, the process returns to step 718 where the computer determines whether a new resource availability option was received. If the data processing system determines that the user did not make the selection, no output of step 728, then the data processing system reserves the resource with the hold placed on it (step 732). Thereafter, the process returns to step 718 where the computer determines whether a new resource availability option was received.

Figure 8:
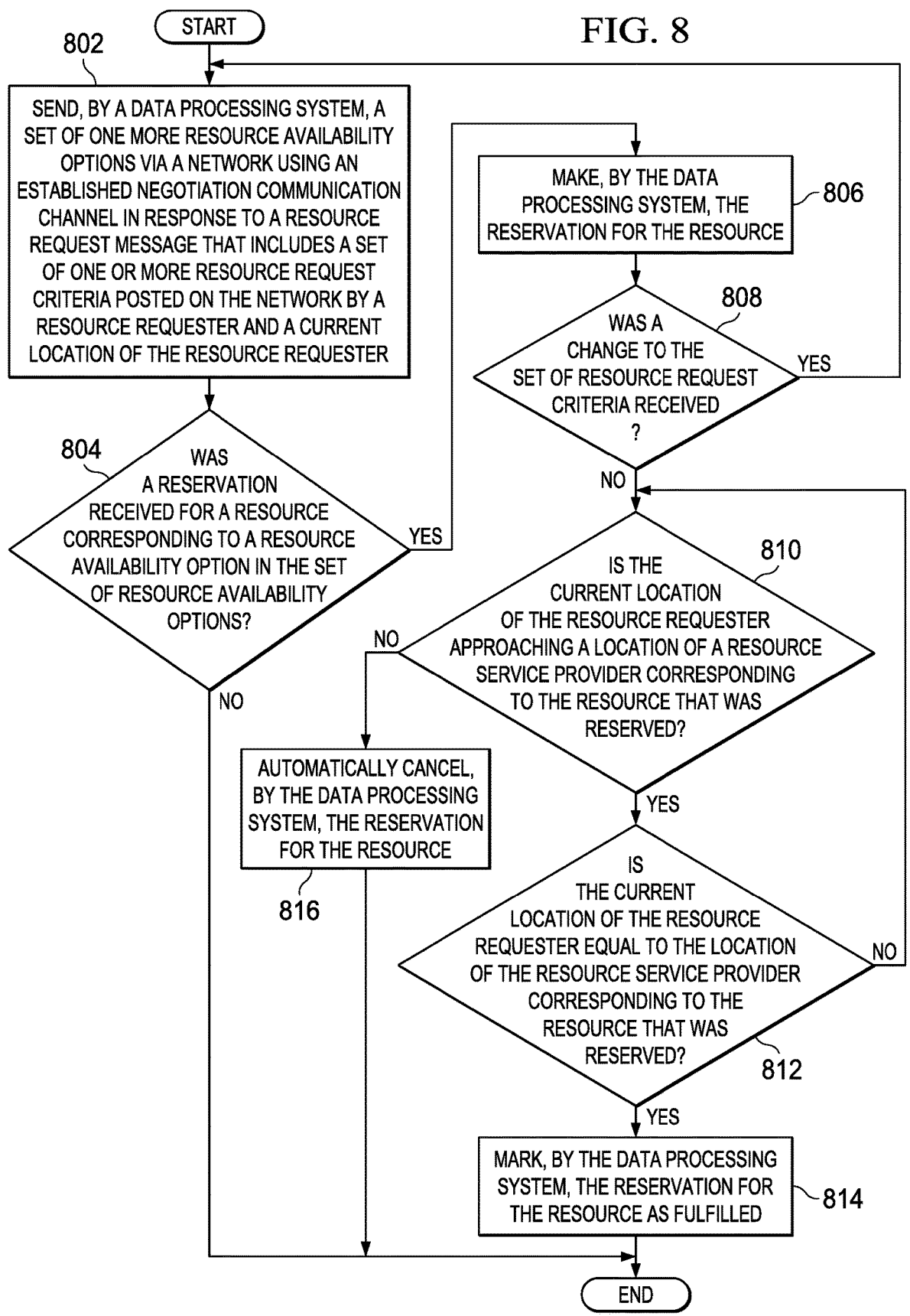
FIG. 8 is a flowchart illustrating a process for a data processing system corresponding to a resource service provider in accordance with an illustrative embodiment.

With reference now to FIG. 8, a flowchart illustrating a process for a data processing system corresponding to a resource service provider is shown in accordance with an illustrative embodiment. The process shown in FIG. 8 may be implemented in a data processing system, such as, for example, client 114 in FIG. 1.

The process begins when the data processing system sends a set of one more resource availability options via a network using an established negotiation communication channel in response to a resource request message that includes a set of one or more resource request criteria posted on the network by a resource requester and a current location of the resource requester (step 802). The set of one more resource availability options may be, for example, resource availability option 414 in FIG. 4. The network may be, for example, network 102 in FIG. 1. The resource request message that includes the set of one or more resource request criteria may be, for example, resource request 410 that includes criteria 412 from user device 402 in FIG. 4. The current location of the resource requester may be, for example, geolocation data 228 in FIG. 2.

Afterward, the data processing system makes a determination as to whether a reservation was received for a resource corresponding to a resource availability option in the set of resource availability options (step 804). If the data processing system determines that no reservation was received for a resource corresponding to a resource availability option in the set of resource availability options, no output of step 804, then the process terminates thereafter. If the data processing system determines that a reservation was received for a resource corresponding to a resource availability option in the set of resource availability options, yes output of step 804, then the data processing system makes the reservation for the resource (step 806).

In addition, the data processing system makes a determination as to whether a change to the set of resource request criteria was received (step 808). If the data processing system determines that a change to the set of resource request criteria was received, yes output of step 808, then the process returns to step 802 where the data processing system sends one or more resource availability options based on the change. If the data processing system determines that a change to the set of resource request criteria was not received, no output of step 808, then the data processing system makes a determination as to whether the current location of the resource requester is approaching a location of a resource service provider corresponding to the resource that was reserved (step 810).

If the data processing system determines that the current location of the resource requester is approaching (i.e., heading toward) the location of the resource service provider corresponding to the resource that was reserved, yes output of step 810, then the data processing system makes a determination as to whether the current location of the resource requester equals the location of the resource service provider corresponding to the resource that was reserved (step 812). If the data processing system determines that the current location of the resource requester is not equal the location of the resource service provider corresponding to the resource that was reserved, no output of step 812, then the process returns to step 810 where the data processing system determines whether the current location of the resource requester is approaching the location of the resource service provider. If the data processing system determines that the current location of the resource requester is equal the location of the resource service provider corresponding to the resource that was reserved, yes output of step 812, then the data processing system marks the reservation for the resource as fulfilled (step 814). Thereafter, the process terminates.

Returning again to step 810, if the data processing system determines that the current location of the resource requester is not approaching (i.e., going away from) the location of the resource service provider corresponding to the resource that was reserved, no output of step 810, then the data processing system automatically cancels the reservation for the resource (step 816). Thereafter, the process terminates.

Thus, illustrative embodiments of the present invention provide a computer-implemented method, data processing system, and computer program product for automatically reserving in real-time a resource of a resource service provider that has resource constraints matching resource request criteria of a resource requester via a negotiation communication channel established between the resource requester and the resource service provider. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

What is claimed is:

1. A computer-implemented method for automatically reserving a requested resource in real-time, the computer-implemented method comprising:
   responsive to a data processing system posting a resource request message that includes a set of resource request criteria on a network, receiving, by the data processing system, a set of resource availability options from a set of resource service providers via the network using a negotiation communication channel;
   ranking, by the data processing system, the set of resource availability options received from the set of resource service providers based on an amount of matching between constraints of each respective resource availability option and the set of resource request criteria;
   displaying, by the data processing system, the set of resource availability options by rank from a greatest amount to a least amount of matching in a resource negotiation table;
   determining, by the data processing system, whether constraints of a particular resource availability option displayed in the resource negotiation table match the set of resource request criteria;
   responsive to the data processing system determining that the constraints of a particular resource availability option displayed in the resource negotiation table match the set of resource request criteria, reserving, by the data processing system, a resource corresponding to the particular resource availability option matching the set of resource request criteria; and
   responsive to the data processing system determining that all constraints of any respective resource availability option displayed in the resource negotiation table do not match the set of resource request criteria, placing, by the data processing system, a hold on a resource corresponding to a resource availability option having constraints with a highest amount of matching to the set of resource request criteria.

2. The computer-implemented method of claim 1 further comprising:
   determining, by the data processing system, whether a geographic location of the data processing system equals a geographic location of a resource service provider associated with a reserved resource; and
   responsive to the data processing system determining that the geographic location of the data processing system is equal to the geographic location of the resource service provider associated with the reserved resource, deleting, by the data processing system, the set of resource availability options from the resource negotiation table.

3. The computer-implemented method of claim 2 further comprising:
   responsive to the data processing system determining that the geographic location of the data processing system is not equal to the geographic location of the resource service provider associated with the reserved resource, determining, by the data processing system, whether a new resource availability option corresponding to a different set of resource service providers was received; and
   responsive to the data processing system determining that the new resource availability option was received, ranking, by the data processing system in real time, the new resource availability option with the set of resource availability options received from the set of resource service providers via the network responsive to the data processing system posting the resource request message.

4. The computer-implemented method of claim 2 further comprising: responsive to the data processing system determining that the geographic location of the data processing system is moving away from the geographic location of the resource service provider associated with the reserved resource, canceling, by the data processing system, a reservation corresponding to the reserved resource.

5. The computer-implemented method of claim 1 further comprising: prompting, by the data processing system, a user of the data processing system to make a selection from the set of resource availability options received from the set of resource service providers via the network responsive to the data processing system posting the resource request message and displayed in the resource negotiation table.

6. The computer-implemented method of claim 1 wherein the set of resource request criteria is also displayed in the resource negotiation table, and further comprising:
   determining, by the data processing system, whether a change was made to the set of resource request criteria within the resource negotiation table; and
   responsive to the data processing system determining that a change was made to the set of resource request criteria within the resource negotiation table, posting, by the data processing system, the change made to the set of resource request criteria on the network in real-time using the negotiation communication channel used to receive the set of resource availability options from the set of resource service providers responsive to the data processing system posting the resource request message.

7. The computer-implemented method of claim 1, wherein the data processing system utilizes at least one of preferences and resource selection history stored in a user profile to determine which resource availability option of the set of resource availability options received from the set of resource service providers via the network responsive to the data processing system posting the resource request message to automatically reserve when two or more resource availability options are substantially equal.

8. The computer-implemented method of claim 1, wherein the resource negotiation table is an interactive table that a user of the data processing system is able to in real-time change a priority rank of one or more criteria in the set of resource request criteria and change a preference of one or more resource availability options in the set of resource availability options received from the set of resource service providers via the network responsive to the data processing system posting the resource request message.

9. The computer-implemented method of claim 1, wherein the set of resource service providers is a plurality of resource service providers, and wherein the negotiation communication channel used to receive the set of resource availability options from the plurality of resource service providers responsive to the data processing system posting the resource request message is a chat room session between the data processing system and the plurality of resource service providers that is used to negotiate for the resource.

10. A data processing system for automatically reserving a requested resource in real-time, the data processing system comprising:
   a bus system;
   a storage device connected to the bus system, wherein the storage device stores program instructions; and
   a processor connected to the bus system, wherein the processor executes the program instructions to:
   receive a set of resource availability options from a set of resource service providers via a network using a negotiation communication channel in response to posting a resource request message that includes a set of resource request criteria on the network;
   rank the set of resource availability options received from the set of resource service providers based on an amount of matching between constraints of each respective resource availability option and the set of resource request criteria;
   display the set of resource availability options by rank from a greatest amount to a least amount of matching in a resource negotiation table;
   determine whether constraints of a particular resource availability option displayed in the resource negotiation table match the set of resource request criteria;
   reserve a resource corresponding to a particular resource availability option matching the set of resource request criteria in response to determining that the constraints of the particular resource availability option displayed in the resource negotiation table match the set of resource request criteria; and
   place a hold on a resource corresponding to a resource availability option having constraints with a highest amount of matching to the set of resource request criteria in response to determining that all constraints of any respective resource availability option displayed in the resource negotiation table do not match the set of resource request criteria.

11. A computer program product for automatically reserving a requested resource in real-time, the computer program product comprising a computer readable storage medium having program instructions embodied therewith, the program instructions executable by a data processing system to cause the data processing system to perform a method comprising:
   responsive to the data processing system posting a resource request message that includes a set of resource request criteria on a network, receiving, by the data processing system, a set of resource availability options from a set of resource service providers via the network using a negotiation communication channel;
   ranking, by the data processing system, the set of resource availability options received from the set of resource service providers based on an amount of matching between constraints of each respective resource availability option and the set of resource request criteria;
   displaying, by the data processing system, the set of resource availability options by rank from a greatest amount to a least amount of matching in a resource negotiation table;
   determining, by the data processing system, whether constraints of a particular resource availability option displayed in the resource negotiation table match the set of resource request criteria;
   responsive to the data processing system determining that the constraints of a particular resource availability option displayed in the resource negotiation table match the set of resource request criteria, reserving, by the data processing system, a resource corresponding to the particular resource availability option matching the set of resource request criteria; and
   responsive to the data processing system determining that all constraints of any respective resource availability option displayed in the resource negotiation table do not match the set of resource request criteria, placing, by the data processing system, a hold on a resource corresponding to a resource availability option having constraints with a highest amount of matching to the set of resource request criteria.

12. The computer program product of claim 11 further comprising:
   determining, by the data processing system, whether a geographic location of the data processing system equals a geographic location of a resource service provider associated with a reserved resource; and
   responsive to the data processing system determining that the geographic location of the data processing system is equal to the geographic location of the resource service provider associated with the reserved resource, deleting, by the data processing system, the set of resource availability options from the resource negotiation table.

13. The computer program product of claim 12 further comprising:
   responsive to the data processing system determining that the geographic location of the data processing system is not equal to the geographic location of the resource service provider associated with the reserved resource, determining, by the data processing system, whether a new resource availability option corresponding to a different set of resource service providers was received; and responsive to the data processing system determining that the new resource availability option was received, ranking, by the data processing system in real-time, the new resource availability option with the set of resource availability options received from the set of resource service providers via the network responsive to the data processing system posting the resource request message.

14. The computer program product of claim 12 further comprising:

responsive to the data processing system determining that the geographic location of the data processing system is moving away from the geographic location of the resource service provider associated with the reserved resource, canceling, by the data processing system, a reservation corresponding to the reserved resource.

\* \* \* \* \*